United States Patent
Otani et al.

(10) Patent No.: US 12,441,639 B2
(45) Date of Patent: Oct. 14, 2025

(54) NEUTRALIZATION PROCESSING SYSTEM FOR AMMONIA-CONTAINING WASTE FLUID AND NEUTRALIZATION PROCESSING METHOD FOR AMMONIA-CONTAINING WASTE FLUID

(71) Applicant: MITSUBISHI KAKOKI KAISHA, LTD., Kanagawa (JP)

(72) Inventors: Yoichiro Otani, Kanagawa (JP); Kenji Matsunari, Kanagawa (JP); Shunma Saito, Kanagawa (JP)

(73) Assignee: MITSUBISHI KAKOKI KAISHA, LTD., Kanagawa (JP)

( * ) Notice: Subject to any disclaimer, the term of this patent is extended or adjusted under 35 U.S.C. 154(b) by 0 days.

(21) Appl. No.: 19/067,547

(22) Filed: Feb. 28, 2025

(65) Prior Publication Data
US 2025/0276923 A1    Sep. 4, 2025

(30) Foreign Application Priority Data
Feb. 29, 2024   (JP) .................. 2024-030240

(51) Int. Cl.
| | | |
|---|---|---|
| *C02F 1/66* | (2023.01) | |
| *C02F 11/00* | (2006.01) | |
| *C02F 101/16* | (2006.01) | |

(52) U.S. Cl.
CPC .............. *C02F 1/66* (2013.01); *C02F 11/004* (2013.01); *C02F 2101/16* (2013.01); *C02F 2201/008* (2013.01); *C02F 2209/06* (2013.01); *C02F 2209/14* (2013.01); *C02F 2209/40* (2013.01); *C02F 2209/42* (2013.01)

(58) Field of Classification Search
None
See application file for complete search history.

(56) References Cited

FOREIGN PATENT DOCUMENTS

| | | | | |
|---|---|---|---|---|
| EP | 4184052 A1 | 5/2023 | | |
| JP | 2003-183217 A | 7/2003 | | |
| JP | 2005-074363 A | 3/2005 | | |
| JP | 3863610 B2 | 12/2006 | | |
| JP | 2010-104914 A | 5/2010 | | |
| JP | 6934555 B1 | 9/2021 | | |
| JP | 2022-037849 A | 3/2022 | | |
| JP | 2023-093265 A | 7/2023 | | |
| JP | 2024-011586 A | 1/2024 | | |
| KR | 10-2023-0045649 A | 4/2023 | | |
| KR | 20230083366 A | * | 6/2023 | ......... B63B 17/0027 |
| KR | 10-2024-0010674 A | 1/2024 | | |

OTHER PUBLICATIONS

MT KR202030083366 (Year: 2023).*
(Continued)

*Primary Examiner* — Peter Keyworth
(74) *Attorney, Agent, or Firm* — Paratus Law Group, PLLC

(57) ABSTRACT

A neutralization processing system for an ammonia-containing waste fluid, includes: one or more sludge tanks; a sludge discharge line configured to supply the waste fluid to the sludge tank; a neutralizer supply line configured to supply a neutralizer to the sludge tank; and a sensor configured to measure pH of the waste fluid or an ammonia concentration of the waste fluid.

14 Claims, 6 Drawing Sheets

(56) References Cited

OTHER PUBLICATIONS

Aug. 13, 2024, Notice of Reasons for Refusal for related JP application No. 2024-030240.
Jan. 7, 2025, Decision to Grant a Patent for related JP application No. 2024-030240.
May 31, 2025, Korean Office Action issued for related KR Application No. 10-2025-0025936.

* cited by examiner

NEUTRALIZATION PROCESSING SYSTEM FOR AMMONIA-CONTAINING WASTE FLUID AND NEUTRALIZATION PROCESSING METHOD FOR AMMONIA-CONTAINING WASTE FLUID

CROSS-REFERENCE TO RELATED APPLICATION(S)

This application is based upon and claims the benefit of priority from prior Japanese patent application No. 2024-030240 filed on Feb. 29, 2024, the entire contents of which are incorporated herein by reference.

BACKGROUND

1. Field of the Invention

The present disclosure relates to a neutralization processing system for an ammonia-containing waste fluid and a neutralization processing method for an ammonia-containing waste fluid.

2. Description of the Related Art

As a countermeasure against global warming, an ammonia fuel, which does not discharge carbon dioxide as a greenhouse gas during combustion, has attracted attention as a promising energy for implementing a carbon-neutral society. In recent years, the practical use of ammonia combustion gas turbines and ammonia combustion engines, which use liquid ammonia as a fuel, has been advanced. In addition, the development for operation of an ammonia fuel ship as a so-called zero-emission ship which uses the liquid ammonia as a fuel also has been advanced.

However, when the liquid ammonia is used for a fuel of a ship or the like, unburned ammonia gas in the engine is dissolved in moisture in lubricating oil. The moisture is mixed into the lubricating oil due to moisture during the operation or condensation after the engine is stopped. When the engine is operated without removing the moisture, an ammonia concentration in the engine increases, and the ammonia is dissolved in the moisture in the lubricating oil. There is a problem that a material exposed to ammonia water and ammonia atmosphere is likely to be corroded. Therefore, the lubricating oil or the like containing ammonia is discarded as a waste fluid.

Such an ammonia-containing waste fluid is recovered in a recovery tank or neutralized (see, for example, JP6934555B1 and JP3863610B).

Since an installation space of the recovery tank or the like is limited in inboard and land power plant facilities, it is desired that the ammonia-containing waste fluid can be neutralized more efficiently.

SUMMARY

An object of the present disclosure is to provide a neutralization processing system for an ammonia-containing waste fluid and a neutralization processing method for an ammonia-containing waste fluid, which can solve the above-described problems and efficiently neutralize the ammonia-containing waste fluid.

According to an aspect of the present disclosure, there is provided a neutralization processing system for an ammonia-containing waste fluid, including: one or more sludge tanks; a sludge discharge line configured to supply the waste fluid to the sludge tank; a neutralizer supply line configured to supply a neutralizer to the sludge tank; and a sensor configured to measure pH of the waste fluid or an ammonia concentration of the waste fluid.

According to an aspect of the present disclosure, there is provided a neutralization processing system for an ammonia-containing waste fluid, including: a sludge discharge line configured to discharge sludge; one or more waste fluid tanks provided at an end of the sludge discharge line; a sludge tank configured to store a waste fluid from the waste fluid tank; a waste fluid discharge line configured to supply the waste fluid to the sludge tank; a neutralizer supply line configured to supply a neutralizer to the waste fluid tank; and a sensor configured to measure pH of the waste fluid or an ammonia concentration of the waste fluid in the waste fluid tank.

According to an aspect of the present disclosure, there is provided a neutralization processing method for an ammonia-containing waste fluid, including: measuring pH or an ammonia concentration of the waste fluid by a sensor; and neutralizing the waste fluid by adding a neutralizer to the waste fluid in accordance with either or both of a measured value of the pH of the waste fluid and a measured value of the ammonia concentration of the waste fluid measured by the sensor.

The neutralization processing system for an ammonia-containing waste fluid and the neutralization processing method for an ammonia-containing waste fluid of the present disclosure can efficiently neutralize an ammonia-containing waste fluid.

BRIEF DESCRIPTION OF THE DRAWINGS

The present disclosure will become more fully understood from the detailed description given hereinbelow and the accompanying drawing which is given by way of illustration only, and thus is not limitative of the present disclosure and wherein.

DETAILED DESCRIPTION OF THE INVENTION

First Embodiment

A neutralization processing system 100 for an ammonia-containing waste fluid and a neutralization processing method for an ammonia-containing waste fluid according to a first embodiment of the present disclosure will be described in detail with reference to FIG. 1.

«Neutralization Processing System for Ammonia-Containing Waste Fluid»

Figure 1:
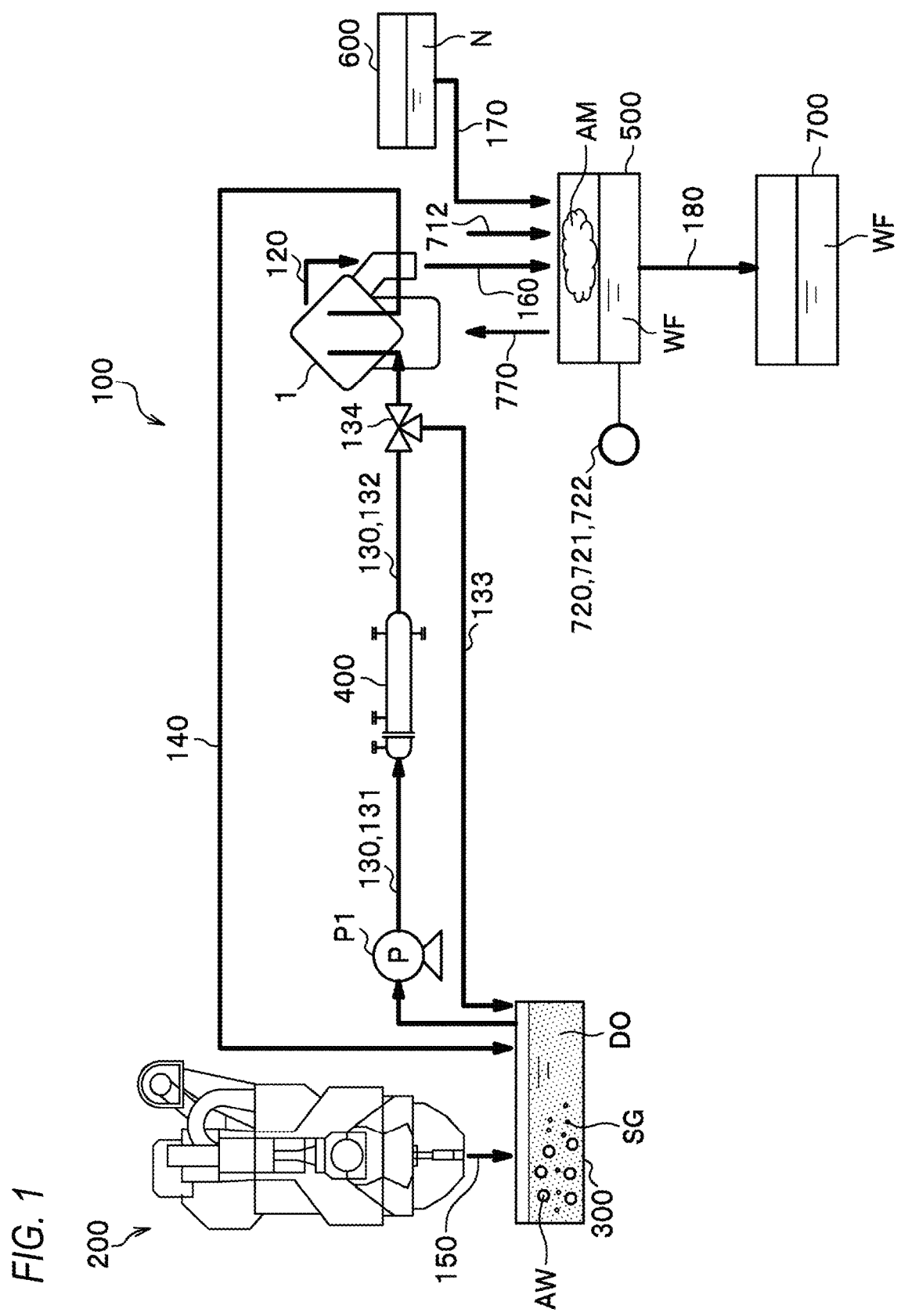
FIG. 1 is a block diagram showing a neutralization processing system for an ammonia-containing waste fluid and a neutralization processing method for an ammonia-containing waste fluid according to a first embodiment of the present disclosure.

The neutralization processing system (hereinafter, appropriately referred to as a "neutralization processing system") 100 for an ammonia-containing waste fluid shown in FIG. 1 is a device for purifying and neutralizing a waste fluid (hereinafter, referred to as a "waste fluid WF") such as a lubricating oil LO, a fuel oil, and bilge water containing ammonia (hereinafter, referred to as "ammonia AM") used in an engine 200 such as a combustion engine installed in an installation space limited in a ship or land (for example, remote island power plants or existing power plants).

Hereinafter, a case in which the lubricating oil LO used in the engine 200 for combusting liquid ammonia is treated as the waste fluid WF will be described as an example of the neutralization processing system 100 according to the present disclosure. The neutralization processing system 100 according to the present disclosure can be used for all ammonia waste fluids as long as they are the waste fluid WF containing the ammonia AM, and the following description will be given of an example in which the neutralization processing system 100 includes a purifier 1.

In the engine 200 using the liquid ammonia as a fuel, sludge SG or ammonia water AW may be mixed into the lubricating oil LO in the engine 200.

The neutralization processing system 100 includes the purifier 1. The purifier 1 is a three-phase separation type disk stack centrifuge that separates a stock solution DO which is the lubricating oil LO mixed with the ammonia water (Hereinafter, it is referred to as "ammonia water AW") into a light fluid which is the purified lubricating oil LO, a heavy fluid which is the ammonia water AW containing the ammonia AM, and sludge which is a solid content (hereinafter, it is referred to as "sludge SG"). The neutralization processing system 100 mainly includes a lubricating oil tank 300, a lubricating oil supply pump P1, the purifier 1, a waste fluid tank 500, a neutralization tank 600, a sludge tank 700, a heavy fluid discharge line 120, a neutralizer supply line 170, a waste fluid discharge line 180, a sensor 720 (a pH meter 721, an ammonia sensor 722, and a liquid level measuring instrument 730), a stock solution supply line 130, and a sludge discharge line 160. The neutralization processing system 100 is disposed in the ship.

«Engine»

For example, the engine 200 shown in FIG. 1 is a ship diesel engine disposed in the ship, and may be a turbine engine that uses, as a fuel, liquid ammonia having a discharge amount of carbon dioxide as a greenhouse gas of zero. The engine 200 includes a mechanism that connects a crankshaft and a piston with only a connecting rod. In the engine 200, a lateral pressure, which is a lateral force, is generated on the piston, causing uneven wear in a cylinder. Therefore, the lubricating oil LO for improving the movement of the piston is used in the engine 200. The engine 200 may co-combust the liquid ammonia and a fossil fuel such as natural gas.

«Lubricating Oil Discharge Line»

A lubricating oil discharge line 150 shown in FIG. 1 is a piping path for transferring the lubricating oil LO (stock solution DO) used in the engine 200 to the lubricating oil tank 300. The lubricating oil discharge line 150 is connected to the engine 200 at one end and to the lubricating oil tank 300 at the other end.

«Lubricating Oil Tank and Lubricating Oil»

As shown in FIG. 1, the lubricating oil tank 300 is a tank for storing the stock solution DO containing the lubricating oil LO used in the engine 200. The stock solution DO to be supplied from the engine 200 to the lubricating oil tank 300 contains the ammonia AM derived from an ammonia fuel. Therefore, the lubricating oil tank 300 is a tank with a lid that prevents the vaporized ammonia AM from leaking outside the lubricating oil tank 300.

The stock solution DO contains moisture mixed in the engine 200.

«Ammonia Water and Water»

The ammonia water AW is an alkaline aqueous solution in which the ammonia AM is dissolved in water. The ammonia water AW has a unique stimulus odor. The ammonia water AW may corrode a fluororubber O-ring or a heavy fluid and light fluid impeller made of copper alloy to be used in the purifier 1. Therefore, the other parts are preferably made of a corrosion-resistant material.

«Stock Solution Supply Line»

The stock solution supply line 130 shown in FIG. 1 is a piping path for supplying the stock solution DO (lubricating oil LO mixed with the sludge SG and the ammonia water AW) stored in the lubricating oil tank 300 to the purifier 1. The stock solution supply line 130 includes a heater upstream side line 131 from the lubricating oil tank 300 to the heater 400, and a heater downstream side line 132 from the heater 400 to the purifier 1. The heater upstream side line 131 is provided with the lubricating oil supply pump P1, and the heater downstream side line 132 is provided with a three-way valve 134.

«Lubricating Oil Supply Pump»

The lubricating oil supply pump P1 is a pump for transferring the stock solution DO in the lubricating oil tank 300 from the stock solution supply line 130 to the purifier 1 via the heater 400. As shown in FIG. 1, the ammonia water AW is mixed into the stock solution DO in the heater upstream side line 131.

«Heater»

The heater 400 is an oil heater that heats the lubricating oil LO to be transferred to the purifier 1. The heater 400 can increase a solid content and/or moisture separation efficiency in the purifier 1 by heating the lubricating oil LO and decreasing a viscosity. As shown in FIG. 1, the ammonia water AW and the sludge SG are mixed into the stock solution DO in the heater downstream side line 132.

«Light Fluid Discharge Line»

A light fluid discharge line 140 is a flow path for returning the lubricating oil LO (light fluid) purified by the purifier 1 to the lubricating oil tank 300. The light fluid discharge line 140 is a piping path from a discharge port of the purifier 1 to a lubricating oil supply port of the lubricating oil tank 300.

«Purifier»

The purifier 1 is a device for separating and removing, from the lubricating oil LO, the sludge SG (solid content) or the ammonia water AW contained in the stock solution DO supplied from the lubricating oil tank 300. The purifier 1 may be, for example, a disk stack centrifuge that separates the stock solution DO into three phases of fluid (light fluid)-fluid (heavy fluid)-solid content by a centrifugal force of a rotating body that rotates at a high speed.

<Sludge Discharge Line>

The sludge discharge line 160 is a discharge path for discharging the sludge SG centrifuged by the purifier 1 to the outside of the purifier 1. The sludge discharge line 160 has an upstream side connected to a sludge discharge port of the purifier 1 and a downstream side connected to the sludge tank 700 via the waste fluid discharge line 180 (see FIG. 1). The sludge SG in the purifier 1 is discharged to the waste fluid discharge line 180, stored in the sludge tank 700, and then discarded.

<Waste Fluid Discharge Line>

The waste fluid discharge line 180 is a waste fluid discharge unit that supplies the waste fluid WF to the sludge tank 700.

<Waste Fluid Tank>

The waste fluid tank 500 shown in FIG. 1 is a tank for storing the waste fluid WF containing the sludge SG separated by the purifier 1. The waste fluid tank 500 is disposed downstream of the sludge discharge line 160. The number of waste fluid tanks 500 may be one or more.

The sludge SG is deposited on an outermost diameter portion side in a rotating body 3 by a centrifugal force of the purifier 1, and is discharged from the sludge discharge port to the sludge discharge line 160.

In the first embodiment, the ammonia water AW (heavy fluid) separated by the purifier 1 is also stored in the waste fluid tank 500.

Similar to the sludge tank 700, the waste fluid tank 500 may be provided with an input water supply line 712 and a vent line 770.

<Neutralization Tank, Neutralizer Supply Line, and Waste Fluid>

The neutralization tank 600 is a tank for storing neutralizers (Hereinafter, it is referred to as "neutralizer N") that neutralize a mixture (hereinafter, referred to as a waste fluid WF) of the sludge SG and the ammonia water AW stored in the waste fluid tank 500. The neutralization tank 600 is provided with the neutralizer supply line 170 that supplies the neutralizer N in the neutralization tank 600 to the waste fluid tank 500.

The neutralizer supply line 170 is a neutralizer supply unit that supplies the neutralizer N to the waste fluid tank 500.

<Neutralizer>

The neutralizer N is used for neutralizing the waste fluid WF containing the ammonia water AW in the waste fluid tank 500, and for example, is made of a material having an acidic component such as citric acid. The neutralizer N may be a solid (powder (including a crystalline state)) or a liquid as long as it can neutralize the waste fluid WF containing the ammonia water AW. The neutralizer N is supplied from the neutralizer supply line 170 to the waste fluid WF in the sludge tank 700. The neutralizer N is supplied in accordance with a measured value of pH, a measured value of an ammonia concentration of the waste fluid WF, and the like detected by the sensor 720, and neutralize the waste fluid WF. The neutralizer N is preferably citric acid. Citric acid is likely to be handled and has high safety. The neutralizer N may be citric acid powders (crystals of anhydrous citric acid ($C_6H_8O_7$) or citric acid hydrate ($C_6H_8O_7H_2O$)) or an aqueous citric acid solution.

When the citric acid is used as the neutralizer N, iron oxide may be added to the waste fluid WF as an additive for detoxification. When the citric acid and the iron oxide are added to the ammonia water AW, ferric ammonium citrate is generated. The neutralizer N and the additive for detoxification may be a solid or a liquid.

<Sludge Tank>

The sludge tank 700 is a tank for storing the waste fluid WF discharged from the waste fluid tank 500. The sludge tank 700 is provided with the waste fluid discharge line 180. When the neutralized waste fluid WF in the sludge tank 700 is 40° C. or higher, a cooling device that cools the waste fluid WF may be disposed.

The sludge tank 700 that stores the neutralized waste fluid WF obtained by neutralizing and detoxifying the ammonia AM can be easily carried out and moved from an installation place.

<Input Water Supply Line>

The input water supply line 712 is a flow path for supplying an appropriate amount of water to the sludge tank 700 or the waste fluid tank 500 in accordance with components, a concentration, or the like of the waste fluid WF in the sludge tank 700 or the waste fluid tank 500. The input water supply line 712 may be provided as necessary, and may be omitted.

<Vent Line>

The vent line 770 is a pipe for discharging gas or water vapor in a gas phase of the sludge tank 700 or the waste fluid tank 500. The vent line 770 serves to adjust the expansion or contraction of gas caused by a change in a pressure or a temperature of the gas in the sludge tank 700 and to remove unnecessary gas. The vent line 770 may be provided with a valve, a pump, a filter, and the like.

<Sensor>

Figure 4:
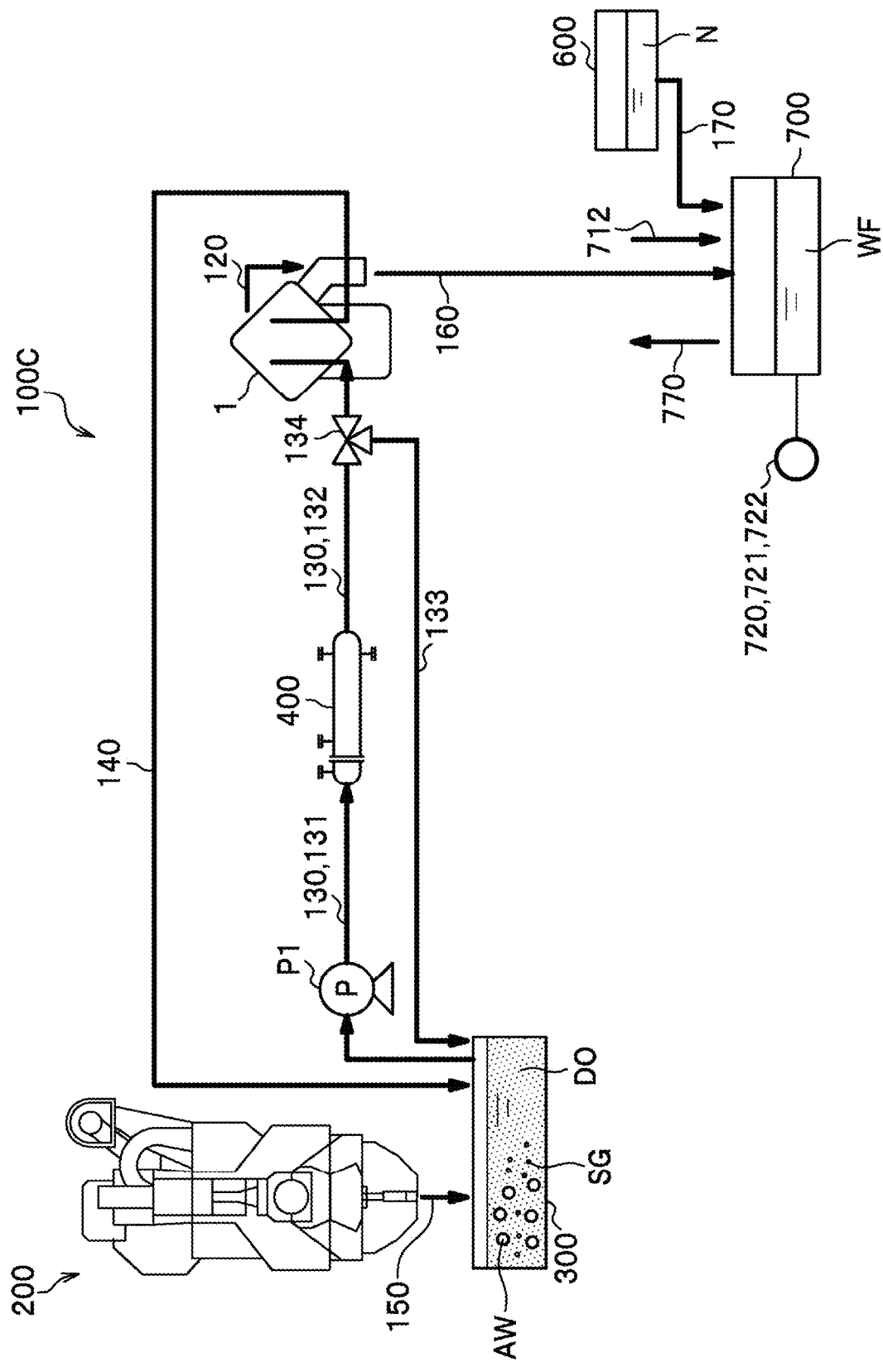
FIG. 4 is a block diagram showing a neutralization processing system for an ammonia-containing waste fluid and a neutralization processing method for an ammonia-containing waste fluid according to a second embodiment of the present disclosure.

The sensor 720 shown in FIG. 1 or 4 is a detector including the pH meter 721 that measures the pH of the waste fluid WF in the sludge tank 700 or the waste fluid tank 500, the ammonia sensor 722 that measures the ammonia concentration of the waste fluid WF, and the like.

The pH meter 721 can efficiently neutralize the waste fluid WF by measuring the pH of the waste fluid WF in the sludge tank 700 or the waste fluid tank 500 and adding an optimum amount of neutralizer N to the waste fluid WF in accordance with the measured value of the pH.

The ammonia sensor 722 can efficiently neutralize the waste fluid WF by measuring the ammonia concentration of the waste fluid WF in the sludge tank 700 or the waste fluid tank 500 and adding an optimum amount of neutralizer N to the waste fluid WF in accordance with the measured value of the ammonia concentration.

<Heavy Fluid Discharge Line>

The heavy fluid discharge line 120 is a flow path through which the ammonia water AW (separated water) centrifuged by the purifier 1 is discharged. The ammonia water AW in the purifier 1 is stored in the sludge tank 700 and then discarded.

«Operations»

Next, operations of the neutralization processing system 100 for an ammonia-containing waste fluid and the neutralization processing method for an ammonia-containing waste fluid according to the first embodiment of the present disclosure will be described with reference to FIG. 1.

As shown in FIG. 1, the lubricating oil LO (stock solution DO) used in the engine 200 is stored in the lubricating oil tank 300, and then introduced into the purifier 1 from the stock solution supply line 130.

The ammonia water AW and the sludge SG (waste fluid WF) separated by the purifier 1 shown in FIG. 1 are discharged from the sludge discharge line 160 to the waste fluid tank 500, and then transferred from the waste fluid discharge line 180 to the sludge tank 700 and stored therein.

On the ship, the sludge SG needs to be unloaded and treated as industrial waste. However, when the ammonia concentration of the sludge SG is high, the unloading may be refused. Therefore, it is preferred to neutralize the waste fluid WF containing the ammonia AM in the ship.

In the waste fluid tank 500, as shown in FIG. 1, at least one of the pH or the ammonia concentration of the waste fluid WF stored in the waste fluid tank 500 is measured by the sensor 720 (the pH meter 721 and the ammonia sensor 722) (measurement step).

Then, the neutralizer N is added to the waste fluid WF to neutralize the waste fluid WF in accordance with at least one of the measured value of the pH of the waste fluid WF or the measured value of the ammonia concentration of the waste fluid WF measured by the sensor 720 (neutralization step). In this way, the waste fluid WF containing the ammonia AM can be efficiently neutralized.

As shown in FIG. 1, the neutralization processing system 100 according to the first embodiment neutralizes the waste fluid WF containing the ammonia AM. The neutralization processing system 100 includes one or more waste fluid tanks 500, the sludge discharge line 160 that supplies the waste fluid WF to the waste fluid tank 500, the neutralizer supply line 170 that supplies the neutralizer N to the waste fluid tank 500, and the sensor 720 (the pH meter 721 and the ammonia sensor 722) that measures the pH of the waste fluid WF or the ammonia concentration of the waste fluid WF.

According to such a configuration, the neutralizer N can be supplied to the waste fluid WF in accordance with at least one of the measured value of the pH of the waste fluid WF or the measured value of the ammonia concentration of the waste fluid WF detected by the sensor 720, and thus the waste fluid WF can be efficiently neutralized.

Processing of supplying the neutralizer N to the waste fluid WF in accordance with the measured value of the ammonia concentration of the waste fluid WF may be performed by automatically operating a pump or a valve using a control device, or may be performed manually.

The neutralizer N has an acidic component. If the neutralizer N is acidic, the neutralizer N can neutralize the waste fluid WF containing the ammonia AM.

The sensor 720 shown in FIG. 1 is either or both of the pH meter 721 and the ammonia sensor 722. In such a configuration, the pH value or the ammonia concentration can be directly measured, and thus an appropriate amount of neutralizer N can be supplied to the waste fluid WF.

The neutralizer N preferably contains citric acid.

According to such a configuration, the citric acid is likely to be handled and has high safety, and thus is easily carried in and stored.

As shown in FIG. 1, the waste fluid tank 500 is provided with the input water supply line 712 for supplying water to the waste fluid tank 500.

According to such a configuration, the waste fluid tank 500 includes the input water supply line 712, and thus the waste fluid WF in the waste fluid tank 500 can be appropriately cooled and diluted by supplying water from the input water supply line 712.

The neutralization processing system 100 includes one or more waste fluid tanks 500 that store the waste fluid WF.

According to such a configuration, a neutralization processing system 100A includes one or more waste fluid tanks 500, and thus can appropriately store the waste fluid WF in accordance with an amount of the waste fluid WF generated in the ship or the like.

As shown in FIG. 1, the neutralization processing method for an ammonia-containing waste fluid of the present embodiment neutralizes the waste fluid WF containing the ammonia AM. Specifically, the pH or the ammonia concentration of the waste fluid WF stored in the sludge tank 700 or the waste fluid tank 500 is measured by the sensor 720 (the pH meter 721, the ammonia sensor 722, and the like), and the waste fluid WF is neutralized by adding the neutralizer N to the waste fluid WF in accordance with either or both of the measured value of the pH of the waste fluid WF and the measured value of the ammonia concentration of the waste fluid WF measured by the sensor 720.

According to such a neutralization processing method for an ammonia-containing waste fluid, the waste fluid WF can be efficiently neutralized by adding the neutralizer N to the waste fluid WF in accordance with the measured value of the pH or the measured value of the ammonia concentration of the waste fluid WF measured by the sensor 720.

Modification of First Embodiment

The present disclosure is not limited to the first embodiment, various modifications and changes can be made within the scope of the technical idea of the present disclosure, and it goes without saying that the present disclosure also covers the modified and changed invention.

Hereinafter, a modification of the neutralization processing system 100 for an ammonia-containing waste fluid and the neutralization processing method for an ammonia-containing waste fluid according to the first embodiment will be described with a focus on differences from the neutralization processing system 100 for an ammonia-containing waste fluid and the neutralization processing method for an ammonia-containing waste fluid according to the first embodiment. The configurations already described are denoted by the same reference numerals, and the description thereof is omitted.

Figure 2:
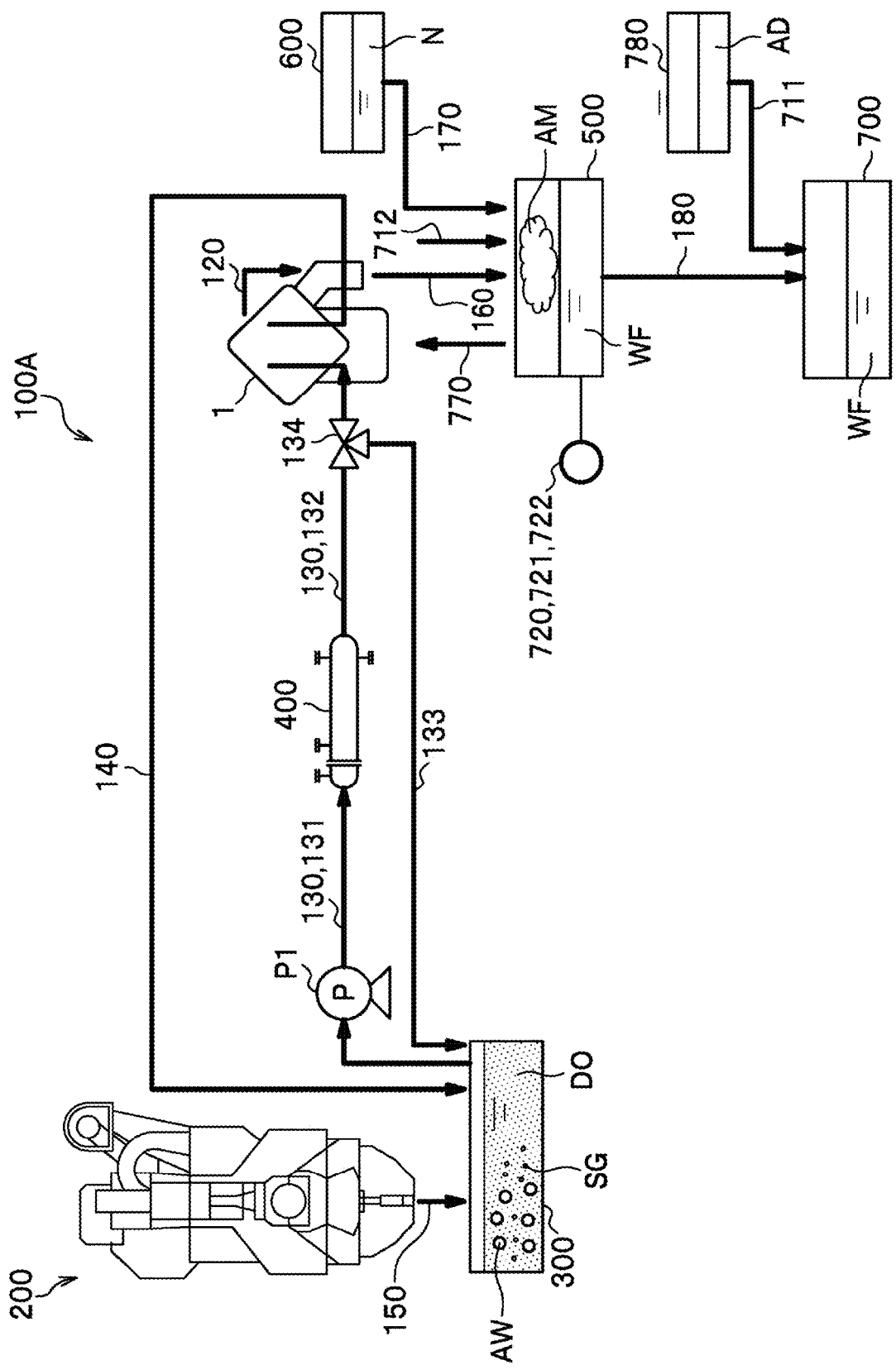
FIG. 2 is a block diagram showing a modification of the neutralization processing system for an ammonia-containing waste fluid and the neutralization processing method for an ammonia-containing waste fluid according to the first embodiment of the present disclosure.
Figure 3:
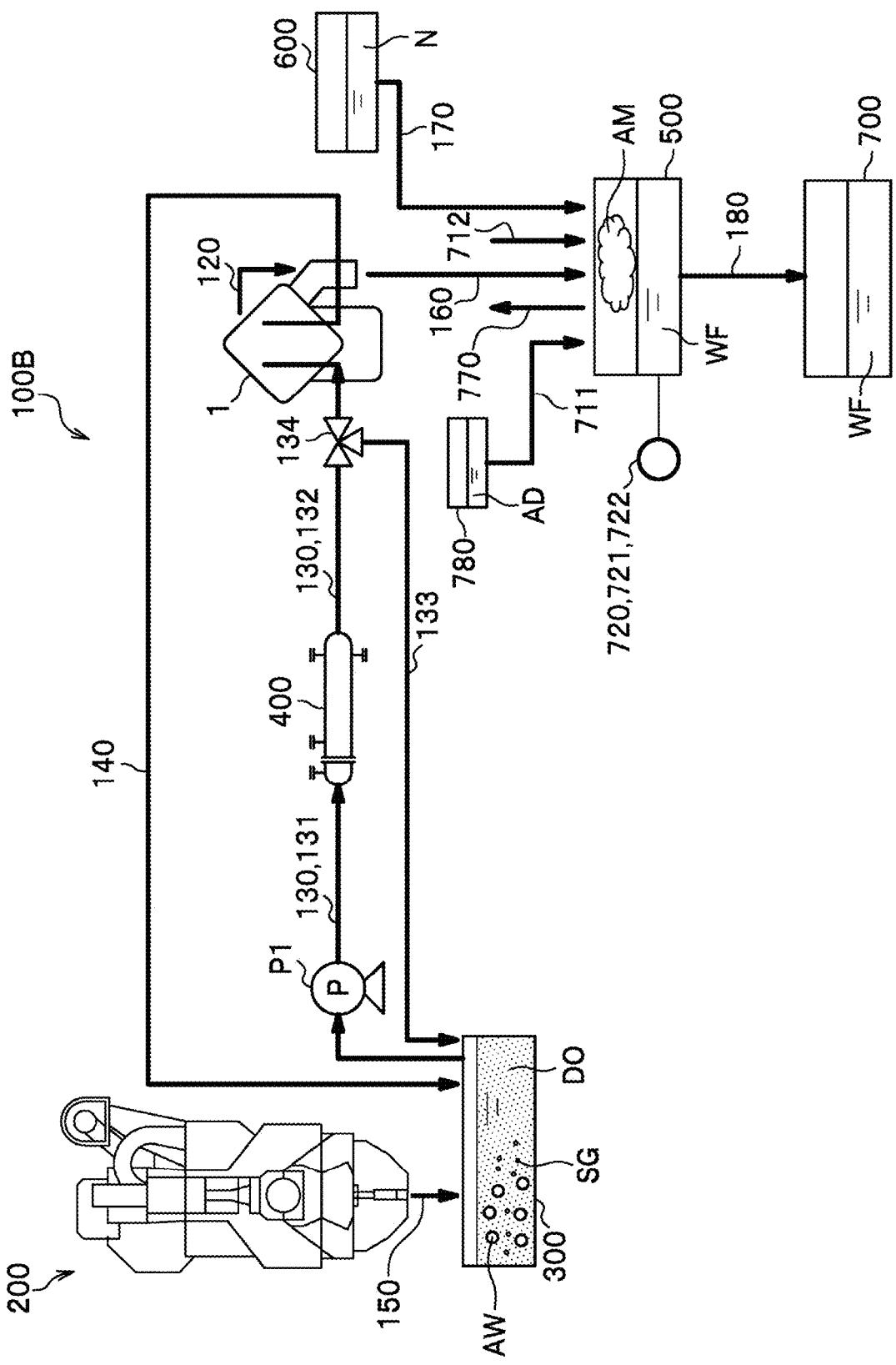
FIG. 3 is a block diagram showing a modification of the neutralization processing system for an ammonia-containing waste fluid and the neutralization processing method for an ammonia-containing waste fluid according to the first embodiment of the present disclosure.

FIGS. 2 and 3 are block diagrams showing a modification of the neutralization processing system 100 for an ammonia-containing waste fluid and the neutralization processing method for an ammonia-containing waste fluid according to the first embodiment of the present disclosure.

The neutralization processing system 100 for an ammonia-containing waste fluid shown in FIG. 1 may further include an additive for detoxification tank 780 that stores additives for detoxification (hereinafter, referred to as an "additive for detoxification AD") and an additive for detoxification supply line 711 which supplies the additive for detoxification AD stored in the additive for detoxification tank 780 to the sludge tank 700 or the waste fluid tank 500, as in neutralization processing systems 100A and 100B for an ammonia-containing waste fluid shown in FIGS. 2 and 3.

According to such a configuration, the neutralization processing systems 100A and 100B include the additive for detoxification tank 780 and the additive for detoxification supply line 711, and thus the waste fluid WF can be detoxified by supplying the additive for detoxification AD to the waste fluid WF in the sludge tank 700 or the waste fluid tank 500.

In this way, the neutralization processing systems 100A and 100B for an ammonia-containing waste fluid include the sludge discharge line 160 configured to discharge the sludge SG, one or more waste fluid tanks 500 provided at an end of the sludge discharge line 160, the sludge tank 700 configured to store the waste fluid WF from the waste fluid tank 500, the waste fluid discharge line 180 configured to supply the waste fluid WF to the sludge tank 700, the neutralizer supply line 170 configured to supply the neutralizer N to the waste fluid tank 500, and the sensor 720 configured to measure the pH of the waste fluid WF or the ammonia concentration of the waste fluid WF in the waste fluid tank 500.

According to such a configuration, the neutralization processing systems 100A and 100B include the sensor 720 that measures the pH of the waste fluid WF or the ammonia concentration of the waste fluid WF in the waste fluid tank 500, and thus the value of the pH or the ammonia concentration can be directly measured, and thus an appropriate amount of neutralizer N can be supplied to the waste fluid tank 500.

As shown in FIG. 2, the neutralization processing system 100A includes the additive for detoxification supply line 711 which supplies the additive for detoxification AD containing iron oxide to the sludge tank 700. When the citric acid is used as the neutralizer N, the iron oxide is preferably supplied to the waste fluid WF as an additive for detoxification.

According to such a configuration, when the citric acid and the iron oxide are added to the ammonia water AW, ferric ammonium citrate is generated, and thus the waste fluid WF can be detoxified.

As shown in FIG. 3, the neutralization processing system 100B includes the additive for detoxification supply line 711 which supplies the additive for detoxification AD containing iron oxide to the waste fluid tank 500. In this case, an upstream side of the additive for detoxification supply line 711 is preferably connected to the additive for detoxification tank 780 that stores the additives for detoxification AD.

According to such a configuration, the neutralization processing system 100B includes the additive for detoxification supply line 711, and thus the waste fluid WF in the waste fluid tank 500 can be detoxified by supplying the additive for detoxification AD to the waste fluid WF.

Second Embodiment

FIG. 4 is a block diagram showing a neutralization processing system 100C for an ammonia-containing waste fluid and a neutralization processing method for an ammonia-containing waste fluid according to a second embodiment of the present disclosure.

The waste fluid tank 500 and the waste fluid discharge line 180 of the first embodiment shown in FIG. 1 may be omitted as in the neutralization processing system 100C shown in FIG. 4.

In this case, the downstream side of the sludge discharge line 160 connected to the purifier 1 is connected to the sludge tank 700. A downstream side of the neutralizer supply line 170 connected to the neutralization tank 600 is connected to the sludge tank 700. The sludge discharge line 160 and the purifier 1 are not limited to one, and may be plural.

Similar to the waste fluid tank 500 shown in FIG. 1, the sludge tank 700 is provided with the sensor 720 (the pH meter 721, the ammonia sensor 722, and the like).

In this case, the neutralization processing system 100C also has the same operation and effect as the neutralization processing system 100 of the first embodiment.

As shown in FIG. 4, the sludge tank 700 of the neutralization processing system 100C may be provided with the input water supply line 712 for supplying water to the sludge tank 700. In this case, the sludge tank 700 is preferably provided with the vent line 770.

According to such a configuration, the sludge tank 700 is provided with the input water supply line 712, and thus the waste fluid WF in the sludge tank 700 can be diluted.

The sludge tank 700 of the neutralization processing system 100C may be provided with the additive for detoxification supply line 711 which supplies the additive for detoxification AD, the liquid level measuring instrument 730 for monitoring an amount (liquid level) of the waste fluid WF stored in the sludge tank 700, and a device or structure 740 having a stirring function to be described later.

Third Embodiment

Figure 5:
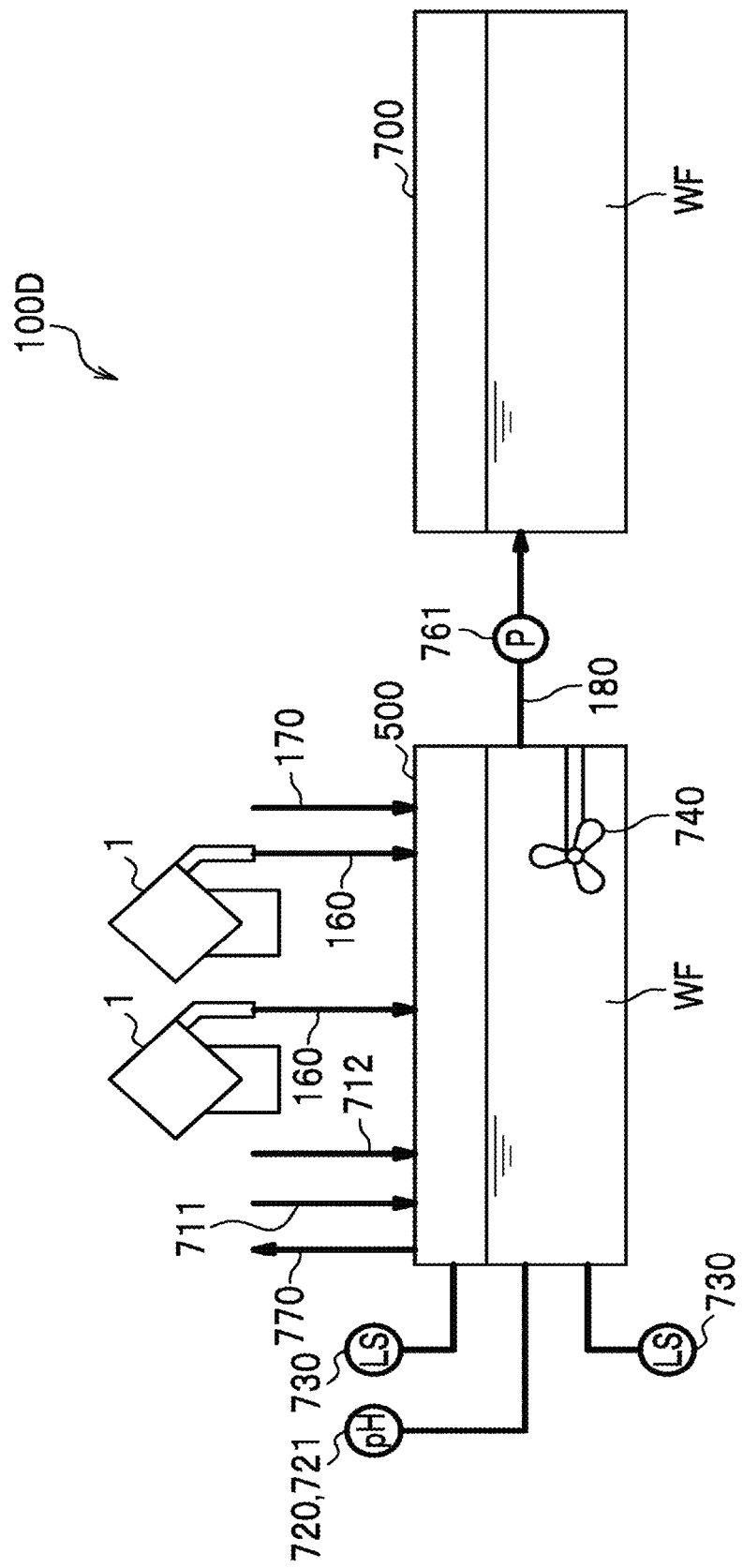
FIG. 5 is a diagram showing a neutralization processing system for an ammonia-containing waste fluid and a neutralization processing method for an ammonia-containing waste fluid according to a third embodiment of the present disclosure, and a schematic diagram showing a waste fluid tank that stores a waste fluid.

FIG. 5 is a diagram showing a neutralization processing system 100D for an ammonia-containing waste fluid and a neutralization processing method for an ammonia-containing waste fluid according to a third embodiment of the present disclosure, and a schematic diagram showing the sludge tank 700 that stores the waste fluid WF.

As shown in FIG. 5, the waste fluid tank 500 may be provided with the waste fluid discharge line 180, a waste fluid transfer pump 761, the device or structure 740 having a stirring function, the neutralizer supply line 170, the sludge discharge line 160, the additive for detoxification supply line 711, the input water supply line 712, the vent line 770, the liquid level measuring instrument 730, and the sensor 720 (for example, the pH meter 721 and the ammonia sensor 722).

A plurality of purifier 1 are provided unlike FIG. 1.

The waste fluid discharge line 180 is a flow path for transferring the waste fluid WF in the waste fluid tank 500 to the sludge tank 700. The waste fluid discharge line 180 is provided with the waste fluid transfer pump 761. The waste fluid transfer pump 761 is a pump for transferring the waste fluid WF in the waste fluid tank 500 to the sludge tank 700. In the present embodiment, the amount of waste fluid WF stored in the waste fluid tank 500 is measured by the liquid level measuring instrument 730, and a flow rate of the waste fluid discharge line 180 (a discharge rate of the waste fluid transfer pump 761) is controlled in accordance with the amount of stored waste fluid WF.

The sludge tank 700, the waste fluid discharge line 180, and the waste fluid transfer pump 761 may be arranged in plural in accordance with the amount of the waste fluid WF to be generated in the ship. In addition, for example, the waste fluid WF can be transferred to any tank in accordance with a liquid level in the tank measured by the liquid level measuring instrument 730. Alternatively, for example, the waste fluid WF that overflows from the waste fluid tank 500 may be guided to the sludge tank 700. In this case, the waste fluid transfer pump 761 may be omitted.

The neutralization processing system 100D may include one or more sludge tanks 700 that store the neutralized waste fluid WF.

According to such a configuration, the neutralization processing system 100D includes one or more sludge tanks 700, and thus can appropriately store the waste fluid WF in accordance with the amount of the waste fluid WF generated in the ship or the like.

The waste fluid tank 500 may be provided with the device or structure 740 having a stirring function of stirring the waste fluid WF. The device or structure 740 having a stirring function may be a device or structure having a function of stirring the waste fluid WF in the waste fluid tank 500, and may be, for example, a stirrer. The device or structure 740 having a stirring function may be appropriately provided in accordance with conditions of the waste fluid WF in the waste fluid tank 500, and the neutralizer N, the additive for detoxification AD, and the like to be added to the waste fluid WF, and may be omitted.

According to such a configuration, by providing the device or structure 740 having a stirring function in the waste fluid tank 500, the neutralizer N or the additive for detoxification AD can be efficiently mixed with the waste fluid WF in the waste fluid tank 500, and the waste fluid WF can be detoxified.

Similarly, the sludge tank 700 may be provided with the device or structure 740 having a stirring function of stirring the waste fluid WF.

According to such a configuration, by providing the device or structure 740 having a stirring function in the sludge tank 700, the neutralizer N or the additive for detoxification AD can be efficiently mixed with the waste fluid WF in the sludge tank 700, and the waste fluid WF can be detoxified.

Similar to the first embodiment, the neutralizer supply line 170 is a conveyance path for supplying the neutralizer N to the waste fluid tank 500. In the neutralizer supply line 170, the neutralizer N in an amount corresponding to the measured value of the pH of the waste fluid WF measured by the sensor 720 (for example, the pH meter 721 and the ammonia sensor 722) is transferred to the waste fluid tank 500.

Similar to the first embodiment, the sludge discharge line 160 is a flow path for discharging the waste fluid WF discharged from the purifier 1 into the waste fluid tank 500. The sludge discharge line 160 and the purifier 1 are not limited to one, and may be plural. Since the neutralization processing system 100D is provided with an appropriate number of sludge discharge lines 160 and purifiers 1, a large amount of waste fluid WF can be suitably treated.

The additive for detoxification supply line 711 is a conveyance path for supplying the additive for detoxification AD that detoxifies the waste fluid WF in the waste fluid tank 500 to the waste fluid tank 500. The additive for detoxification can be appropriately selected according to the components of the waste fluid WF. When the neutralizer N is citric acid, the additive for detoxification is preferably iron oxide. In the additive for detoxification supply line 711, the additive for detoxification AD is transferred to the waste fluid tank 500 in an amount corresponding to the measured value of the pH or the measured value of the ammonia concentration of the waste fluid WF measured by the sensor 720. The neutralization processing system 100D can detoxify the waste fluid WF in the waste fluid tank 500 by providing the additive for detoxification supply line 711 and adding the additive for detoxification AD.

The additive for detoxification supply line 711 may be appropriately provided according to the components of the waste fluid WF in the waste fluid tank 500, and may be omitted.

The input water supply line 712 is a flow path for supplying an appropriate amount of water W in accordance with the components, the concentration, and the like of the waste fluid WF in the waste fluid tank 500. The neutralization processing system 100D can dilute the waste fluid WF in the waste fluid tank 500 by providing the input water supply line 712 to input water.

The input water supply line 712 may be appropriately provided according to the components or the conditions of the waste fluid WF in the waste fluid tank 500, and may be omitted.

The vent line 770 is a pipe for discharging gas or water vapor in the gas phase of the waste fluid tank 500. The vent line 770 serves to adjust the expansion or contraction of gas caused by a change in a pressure or a temperature of the gas in the waste fluid tank 500 and to remove unnecessary gas. The vent line 770 may be provided with a valve, a pump, a filter, and the like.

The liquid level measuring instrument 730 is a meter for measuring the amount (liquid level) of waste fluid WF stored in the waste fluid tank 500. By providing the liquid level measuring instrument 730, the waste fluid transfer pump 761 can be driven in accordance with the amount of waste fluid stored in the waste fluid tank 500 to transfer the waste fluid WF to the sludge tank 700.

The liquid level measuring instrument 730 may be appropriately provided as necessary, and may be omitted.

Further, the neutralization processing system 100D may be provided with a weir instead of the liquid level measuring instrument 730 to allow the waste fluid WF in the waste fluid tank 500 to flow (overflow) from the waste fluid discharge line 180 to the sludge tank 700 when the waste fluid WF in the waste fluid tank 500 reaches a predetermined liquid level.

Similar to the first embodiment, the sensor 720 includes the pH meter 721.

In this way, in the neutralization processing system 100D for an ammonia-containing waste fluid, the waste fluid tank 500 is provided with the liquid level measuring instrument 730, and the neutralized waste fluid WF in the waste fluid tank 500 is freely transferred to the sludge tank 700 in accordance with the liquid level of the neutralized waste fluid WF.

According to such a configuration, the neutralization processing system 100D can transfer the neutralized waste fluid WF in the waste fluid tank 500 to the sludge tank 700 in accordance with the liquid level of the waste fluid WF. Therefore, if the amount of waste fluid WF stored in the waste fluid tank 500 increases, the waste fluid WF can be automatically transferred to the sludge tank 700 as appropriate, and a large amount of waste fluid WF can be efficiently stored.

Fourth Embodiment

Figure 6:
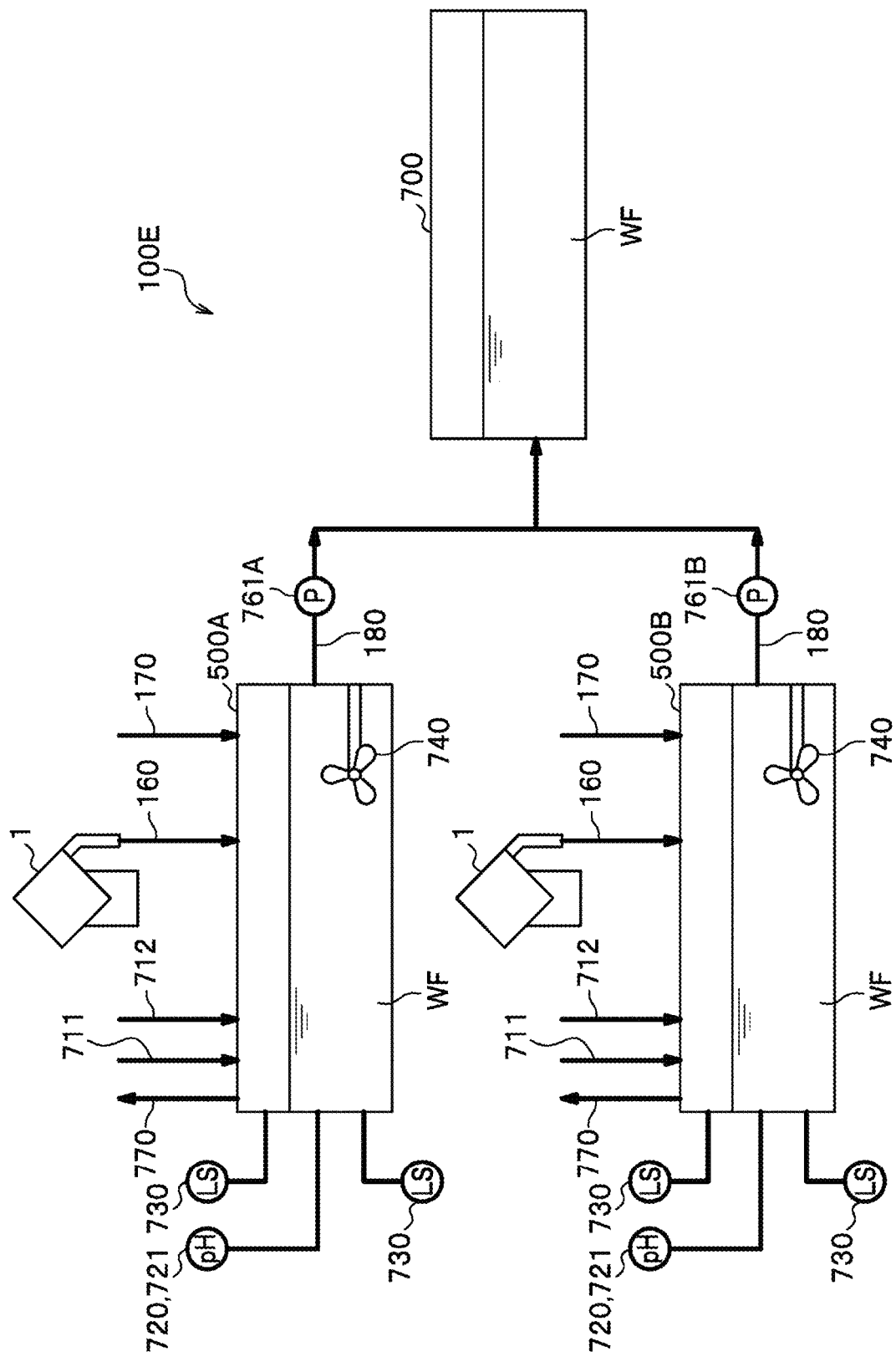
FIG. 6 is a diagram showing a neutralization processing system for an ammonia-containing waste fluid and a neutralization processing method for an ammonia-containing waste fluid according to a fourth embodiment of the present disclosure, and a schematic diagram showing a waste fluid tank that stores a waste fluid.

FIG. 6 is a diagram showing a neutralization processing system 100E for an ammonia-containing waste fluid and a neutralization processing method for an ammonia-containing waste fluid according to a fourth embodiment, and a schematic diagram showing the sludge tank 700 that stores the waste fluid WF.

The case in which the neutralization processing system 100D for an ammonia-containing waste fluid of the third embodiment (see FIG. 5) includes one waste fluid tank 500 have been described, and as in the neutralization processing system 100E shown in FIG. 6, the neutralization processing system 100D may include a plurality of waste fluid tanks 500A and 500B.

The neutralization processing system 100E includes a plurality of waste fluid tanks 500A and 500B and one sludge tank 700. Further, the amount of waste fluid WF that can be stored can be increased, and thus the neutralization processing system 100E can cope with large ships or large facilities. Further, the neutralization processing can be performed at a plurality of locations, and thus when one of the waste fluid tanks 500A and 500B cannot be used due to a maintenance, a failure, or the like, the processing of the waste fluid WF can also be continued.

It is preferred that the two waste fluid tanks 500A and 500B each are provided with the waste fluid discharge line 180, waste fluid transfer pumps 761A and 761B, the device or structure 740 having a stirring function, the neutralizer supply line 170, the sludge discharge line 160, the additive for detoxification supply line 711, the input water supply line 712, the vent line 770, the liquid level measuring instrument 730, and the sensor 720 (for example, the pH meter 721 and the ammonia sensor 722).

The waste fluid WF accumulated in the waste fluid tanks 500A and 500B may be transferred from the waste fluid discharge line 180 to the sludge tank 700 by driving the waste fluid transfer pumps 761A and 761B in accordance with liquid levels in the waste fluid tanks 500A and 500B.

[Modification 1]

In the first embodiment, the case in which the purifier 1 is the three-phase separation type disk stack centrifuge has been exemplified, and a two-phase separation type disk stack centrifuge may be used as the purifier 1. When the two-phase separation type disk stack centrifuge is used as the purifier 1, it is preferred to provide a pressure sensor 840 that detects a pressure of the ammonia water AW to be discharged from a heavy fluid extraction unit 15 of the purifier 1 and supply water to a separation chamber of the purifier 1 when a measured value of the pressure sensor 840 falls below a predetermined value.

[Modification 2]

In the first to fourth embodiments and Modification 1, the case in which the neutralization processing systems 100, 100A, 100B, 100C, 100D, and 100E include the purifier 1 is exemplified, and these neutralization processing systems may not include the purifier 1. In this case, the same operation and effect as those of the neutralization processing systems 100 to 100E of the first to fourth embodiments and Modification 1 can also be achieved.

The invention claimed is:

1. A neutralization processing system for an ammonia-containing waste fluid, the neutralization processing system separating a waste fluid containing at least sludge and ammonia from lubricating oil after use in a ship diesel engine to neutralize the waste fluid, the neutralization processing system comprising:
a purifier configured to purify the lubricating oil;
a sludge tank;
a sludge discharge line configured to supply the waste fluid separated from the lubricating oil by the purifier to the sludge tank;
a neutralizer supply line configured to supply a neutralizer to the sludge tank; and
a sensor configured to measure pH of the waste fluid or an ammonia concentration of the waste fluid.

2. The neutralization processing system for an ammonia-containing waste fluid according to claim 1, wherein
the neutralizer has an acidic component.

3. The neutralization processing system for an ammonia-containing waste fluid according to claim 1, wherein
the sensor is either or both of a pH meter and an ammonia sensor.

4. The neutralization processing system for an ammonia-containing waste fluid according to claim 1, wherein
the neutralizer contains citric acid.

5. The neutralization processing system for an ammonia-containing waste fluid according to claim 4, further comprising:
an additive for detoxification supply line configured to supply iron oxide to the sludge tank.

6. The neutralization processing system for an ammonia-containing waste fluid according to claim 1, wherein
the sludge tank is provided with a device having a stirring function of stirring the waste fluid.

7. The neutralization processing system for an ammonia-containing waste fluid according to claim 1, wherein
the sludge tank is provided with an input water supply line for supplying water to the sludge tank.

8. A neutralization processing system for an ammonia-containing waste fluid, the neutralization processing system separating a waste fluid containing at least sludge and ammonia from lubricating oil after use in a ship diesel engine to neutralize the waste fluid, the neutralization processing system comprising:
a purifier configured to purify the lubricating oil;
a waste fluid tank;
a sludge discharge line configured to supply the waste fluid separated from the lubricating oil by the purifier to the waste fluid tank;
a sludge tank configured to store the waste fluid from the waste fluid tank;
a waste fluid discharge line configured to supply the waste fluid in the waste fluid tank to the sludge tank;
a neutralizer supply line configured to supply a neutralizer to the waste fluid tank; and
a sensor configured to measure pH of the waste fluid or an ammonia concentration of the waste fluid in the waste fluid tank.

9. The neutralization processing system for an ammonia-containing waste fluid according to claim 8, further comprising:
an additive for detoxification supply line configured to supply iron oxide to the waste fluid tank, wherein
the neutralizer contains citric acid.

10. The neutralization processing system for an ammonia-containing waste fluid according to claim 8, wherein
the waste fluid tank is provided with a device having a stirring function of stirring the waste fluid.

11. The neutralization processing system for an ammonia-containing waste fluid according to claim 8, wherein
the waste fluid tank is provided with an input water supply line for supplying water to the waste fluid tank.

12. The neutralization processing system for an ammonia-containing waste fluid according to claim 8, further comprising:
a liquid level measuring instrument provided with the waste fluid tank, the liquid level measuring instrument being configured to measure an amount of a neutralized waste fluid stored in the waste fluid tank; and
a waste fluid transfer pump configured to transfer the waste fluid in the waste fluid tank to the sludge tank, wherein
a discharge rate of the waste fluid transfer pump is controlled in accordance with the amount of the neutralized waste fluid measured by the liquid level measuring instrument.

13. A neutralization processing system for an ammonia-containing waste fluid, the neutralization processing system separating sludge and ammonia water from lubricating oil after use in a ship diesel engine to neutralize a waste fluid containing at least sludge and ammonia water, the neutralization processing system comprising:
a purifier configured to purify the lubricating oil;
a waste fluid tank;
a sludge discharge line configured to supply the sludge separated from the lubricating oil by the purifier to the waste fluid tank;

a heavy fluid discharge line configured to supply the ammonia water separated from the lubricating oil by the purifier to the waste fluid tank;

a neutralizer supply line configured to supply a neutralizer to the waste fluid tank;

a sensor configured to measure pH of the waste fluid or an ammonia concentration of the waste fluid in the waste fluid tank; and a sludge tank configured to store the waste fluid from the waste fluid tank.

14. A neutralization processing system for an ammonia-containing waste fluid, the neutralization processing system separating sludge and ammonia water from lubricating oil after use in a ship diesel engine to neutralize a waste fluid containing at least sludge and ammonia water, the neutralization processing system comprising:

a purifier configured to purify the lubricating oil;

a sludge tank;

a sludge discharge line configured to supply the sludge separated from the lubricating oil by the purifier to the sludge tank;

a heavy fluid discharge line configured to supply the ammonia water separated from the lubricating oil by the purifier to the sludge tank;

a neutralizer supply line configured to supply a neutralizer to the sludge tank; and a sensor configured to measure pH of the waste fluid or an ammonia concentration of the waste fluid.

* * * * *